United States Patent
Syed et al.

(10) Patent No.: US 9,607,059 B2
(45) Date of Patent: Mar. 28, 2017

(54) INTELLIGENT DATA MINING AND PROCESSING OF MACHINE GENERATED LOGS

(71) Applicants: Awez Syed, San Jose, CA (US); Nancy Yan, Cupertino, CA (US); Hermant Puranik, San Ramon, CA (US); Justin Martinson, Bellevue, WA (US); MonFor Yee, Palo Alto, CA (US); David Burdett, Orinda, CA (US)

(72) Inventors: Awez Syed, San Jose, CA (US); Nancy Yan, Cupertino, CA (US); Hermant Puranik, San Ramon, CA (US); Justin Martinson, Bellevue, WA (US); MonFor Yee, Palo Alto, CA (US); David Burdett, Orinda, CA (US)

(73) Assignee: SAP SE, Walldorf (DE)

( * ) Notice: Subject to any disclaimer, the term of this patent is extended or adjusted under 35 U.S.C. 154(b) by 239 days.

(21) Appl. No.: 14/169,389

(22) Filed: Jan. 31, 2014

(65) Prior Publication Data
US 2015/0220605 A1 Aug. 6, 2015

(51) Int. Cl.
*G06F 17/30* (2006.01)
*G06F 17/40* (2006.01)

(52) U.S. Cl.
CPC ........ *G06F 17/30563* (2013.01); *G06F 17/40* (2013.01)

(58) Field of Classification Search
None
See application file for complete search history.

(56) References Cited

U.S. PATENT DOCUMENTS

| | | | | |
|---|---|---|---|---|
| 8,620,928 B1* | 12/2013 | Walton | ........... | G06F 17/3053 707/748 |
| 8,676,863 B1* | 3/2014 | Connell | ........... | G06F 17/30917 707/804 |
| 2002/0073138 A1* | 6/2002 | Gilbert | ........... | G06F 17/30 709/201 |
| 2003/0046370 A1* | 3/2003 | Courtney | ........... | H04L 41/0266 709/220 |
| 2003/0055723 A1* | 3/2003 | English | ........... | G06Q 30/02 705/14.51 |
| 2003/0130801 A1* | 7/2003 | Kagan | ........... | G06F 19/22 702/20 |
| 2006/0184529 A1* | 8/2006 | Berg | ........... | G06F 11/0709 |
| 2008/0021898 A1* | 1/2008 | Hoglund | ........... | G06F 17/30657 |
| 2013/0018781 A1* | 1/2013 | Prada Peyser | ........... | G06Q 20/20 705/39 |
| 2013/0205192 A1* | 8/2013 | Spada | ........... | G06F 17/2264 715/227 |

OTHER PUBLICATIONS

CsvReader, Jan. 15, 2008, accessed May 9, 2016 at http://web.archive.org/web/20080115121753/http://javacsv.sourceforge.net/com/csvreader/CsvReader.html.*

* cited by examiner

*Primary Examiner* — William Spieler
(74) *Attorney, Agent, or Firm* — Buckley, Maschoff & Talwalkar LLC (57) ABSTRACT

According to some embodiments, a method and an apparatus of analyzing log files comprises sampling a log and determining a structure associated with the log file based on the sampling and a pattern within the structure. If the structure and the pattern are stored in a repository, data from the log file will be exported into a database based on the determined pattern.

20 Claims, 6 Drawing Sheets

2013/06/12 12:20:52.994  1484  2072 S0  X-Attribute[1]::Received_UnknownMeetingCommand(): target 192.168.2.4[849168506,-17953333065] does not exists, source [3537936675,-541365166], CommandVersion 73

2013/06/12 12:20:52.994  1484  2072 S0  X-Attribute[1]::Received_UnknownMeetingCommand(): target 192.168.3.6 [8491685​06,-17953333065] does not exists, source [3537936675,-541365166], CommandVersion 73

2013/06/12 12:20:52.994  1484  2072 S0  X-Attribute[1]::Received_UnknownMeetingCommand(): target 192.168.5.255 [849168506,-17953333065] does not exists, source [3537936675,-541365166], CommandVersion 73

2013/06/12 12:20:52.994  1484  2072 S0  X-Attribute[1]::Received_UnknownMeetingCommand(): target 192.168.4.8 [849168506,-17953333065] does not exists, source [3537936675,-541365166], CommandVersion 73

2013/06/12 12:20:52.995  1484  2072 S0  X-Attribute[1]::Received_UnknownMeetingCommand(): target 192.168.3.6 [849168506,-17953333065] does not exists, source [3537936675,-541365166], CommandVersion 73

2013/06/12 12:20:52.995  1484  2072 S0  X-Attribute[1]::Received_UnknownMeetingCommand(): target 192.168.2.4 [849168506,-17953333065] does not exists, source [3537936675,-541365166], CommandVersion 73

FIG. 2

| Pattern ID | Pattern Attribute 1 | Pattern Attribute 2 | Applicatoin ID | Parsing Data |
|---|---|---|---|---|
| 1 | X-Attribute | CommandVersion 73 | Application A | XXX |
| 2 | X-Attribute | FFFF76 | Application B | YYY |
| 3 | Series6 | 123-F23 | Application C | XYXY |
| 4 | FACB346CA | !!!Warning-6!!! | Application D | YXYX |

| IP Address | Error | SSN |
|---|---|---|
| 192.168.2.4 | CommandVersion 73 | xxx-xx-xxxx |
| 192.168.3.6 | CommandVersion 73 | yyy-yy-yyyy |
| 192.168.5.255 | CommandVersion 73 | zzz-zz-zzzz |
| | | |

610 — IP Address; 620 — Error; 630 — SSN

| IP Address | Error | Longitude | Lattitude | Country | User Name |
|---|---|---|---|---|---|
| 192.168.2.4 | CommandVersion 73 | 72.6743° W | 41.7627° N | USA | Robert Jones |
| 192.168.3.6 | CommandVersion 73 | 34.8000° E | 32.0833° N | Israel | Shlomit Botton |
| 192.168.5.255 | CommandVersion 73 | 118.2500° W | 34.0500° N | USA | Barbara Smith |
| | | | | | |

610 — IP Address; 620 — Error; 640 — Longitude; 650 — Lattitude; 660 — Country; 670 — User Name

INTELLIGENT DATA MINING AND PROCESSING OF MACHINE GENERATED LOGS

BACKGROUND

A log file, or simply a log, is a file that records events which have occurred during execution of a computer system or during the execution of a file. The purpose of a log file is to provide data which may be used to understand activity that occurred during the execution of the computer system and to diagnose problems with applications or an operating system running on the computer system. Logs may comprise machine-generated data that are generated by internet protocol ("IP") enabled end-points or devices like web logs, network events, call data records, and RFID information.

Log files may be partitioned based on a maximum file size of a log file which can make a log file difficult to understand. Most organizations lack an ability to understand unfiltered data embedded in logs to derive any real business value from the log files. Data contained within a log file may vary depending on a type of log file and may require one or more tools to capture and store data. However, even when captured and stored, understanding the log files must come from manual interaction with the log files, if the data is even manageable. Data analysts still face challenges organizing and processing log data due to a lack of proper technical skills. Moreover, data analysts often find themselves in a repeated effort on manual data classification and data mining.

DETAILED DESCRIPTION

The present embodiments relate to a method, system and apparatus to automatically examine log files, determine a log format, discover relationships in and across other log files, propose best field names as well as mining options based on a content type of a log field. The present embodiments may automatically recognize a structure based on pattern(s) in a repository, automatically recognize fields based on content types in a log file, and automatically provide field enhancements based on content of the log file.

Determining a structure and a pattern associated with the log file may use patterns stored in a repository as a reference for automatic detection of structures and patterns. When a pattern is determined to be stored in the repository, data from the log file may be exported into a database (e.g., a relational database) based on the determined pattern. In addition, a content type may be determined based on a pattern of a log field and subsequent enhancement options may be provided for log processing.

Figure 1:
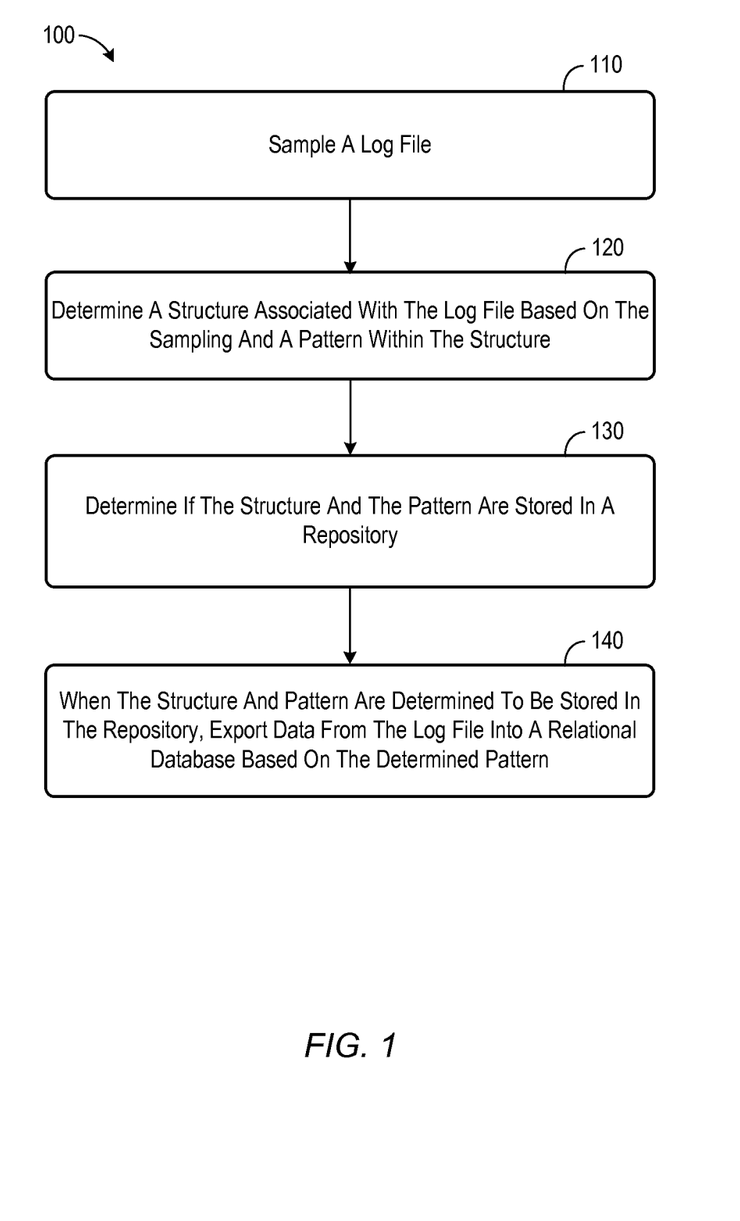
FIG. 1 illustrates a method according to some embodiments.

Referring to FIG. 1, an embodiment of a method 100 is illustrated. The method 100 may relate to automatically processing a log file. Furthermore, the method 100 may be performed by an apparatus such as, but not limited to, the apparatus of FIG. 5. At 110, a log file is sampled. The log file may be sampled by traversing the log file, line by line by line breaking, and processing each line as it is sampled. In some embodiments, processing each line may comprise scanning each line of the log file for structures that comprise (1) a pattern (e.g., data patterns, data, distinct values, and regular expressions), (2) a series of known characters (e.g., a group of American Standard Code for Information Interchange ("ASCII") characters), and/or other recognizable attributes. A structure may comprise a segment of the log file, such as an entry in the log file. Log file entries may be separated, for example, by a new line, a time stamp, or a carriage return. In some embodiments, when multiple log files are examined, the log files may be clustered based on file names prior to sampling a log file.

For illustrative purposes, and to aid in understanding features of the specification, an example will be introduced. This example is not intended to limit the scope of the claims. Now referring to FIG. 2, an embodiment of a portion of a log file 200 is illustrated. Log file 200 comprises a plurality of text lines. However, in the present embodiment, nowhere does the log file 200 indicate a name of an application or an operating system that generated the log file 200. Each line of the log file 200 may be read and analyzed for structures as well as a known series of characters and/or a pattern.

Referring back to FIG. 1, at 120, a structure associated with the log file and a pattern within the structure are determined. The determination may be made via a processor such as, but not limited to, the processor described with respect to FIG. 5. For each log file that is sampled, a structure associated with the log is determined. Each structure may contain multiple line patterns (e.g., multiple regular expressions where a regular expression comprises a sequence of characters that forms a search pattern). A pattern may comprise a reliable sample of traits, tendencies, or other repeatable observable characteristics of the log file. Patterns may comprise a single attribute that is repeated over a plurality of lines in a log file or may comprise multiple attributes that are repeated over a plurality of lines in the log file.

Figure 2:
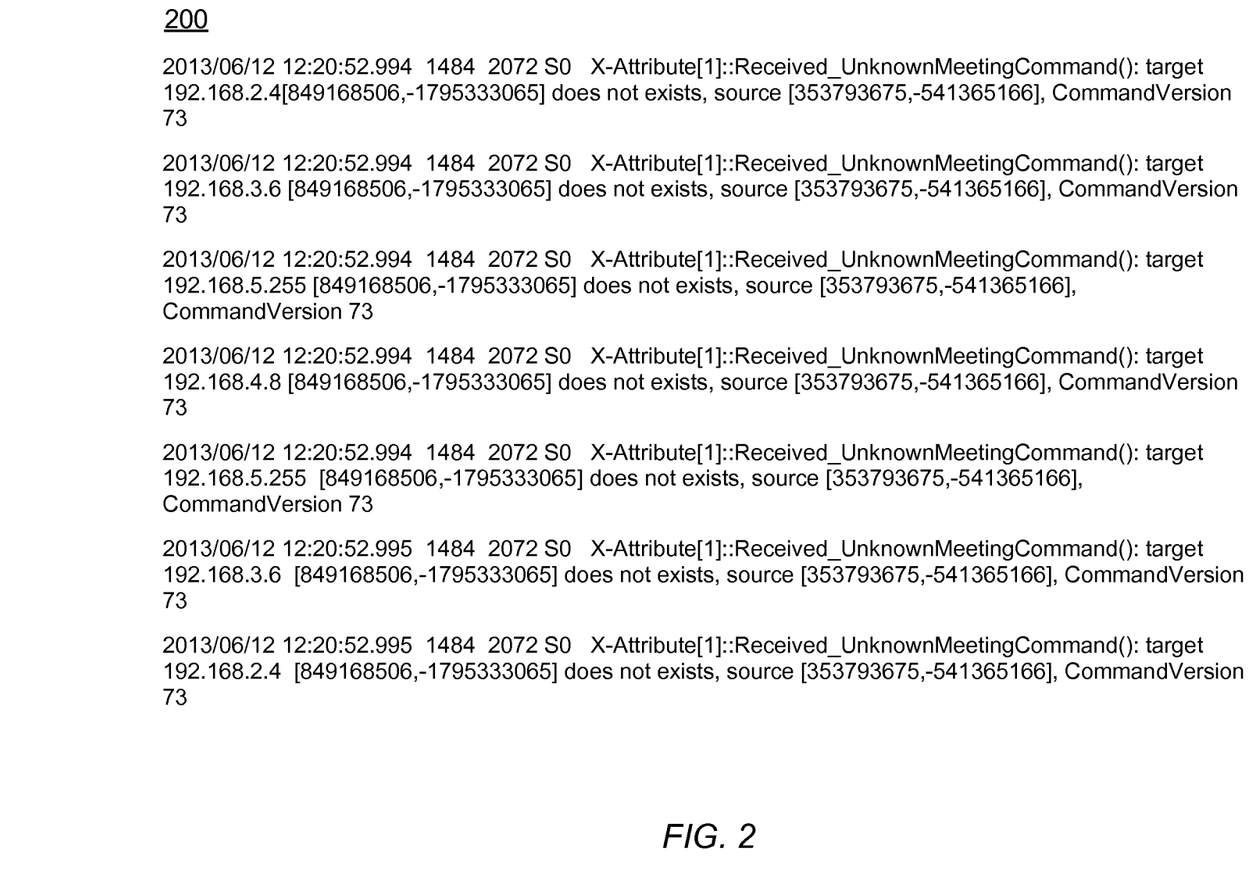
FIG. 2 illustrates a portion of a log file according to some embodiments.

Continuing with the above example, the log file 200 may comprise a plurality of structures, such as "2013/06/12 12:20:52.994 1484 2072 S0 X-Attribute[1]::Received_UnknownMeetingCommand(   ): target 192.168.5.255 [849168506,−1795333065] does not exists, source [353793675,−541365166], CommandVersion 73" which are separated by carriage returns and each structure of log file 200 may indicate the phrase "X-Attribute" and "Command Version 73" and each of these attributes may be associated with an individual pattern or the combination of the two (e.g., having both "X-Attribute" and "CommandVersion 73") may be associated with an individual pattern. Patterns may comprise any repeated character or symbol grouping.

At 130, a determination if the structure and the pattern are stored in a repository is made. In some embodiments, a determination is made as to whether or not the structure and pattern (e.g., a regular expression) exist in a repository. Each pattern of the structure may be looked up in a repository to determine if the pattern is a known pattern (and if the structure is known) or if the pattern has yet to be discovered.

If the pattern is known, then information associated with the pattern may be retrieved from the repository. If the pattern is not known, then information associated with the pattern may be stored in the repository for reuse later.

Figure 3:
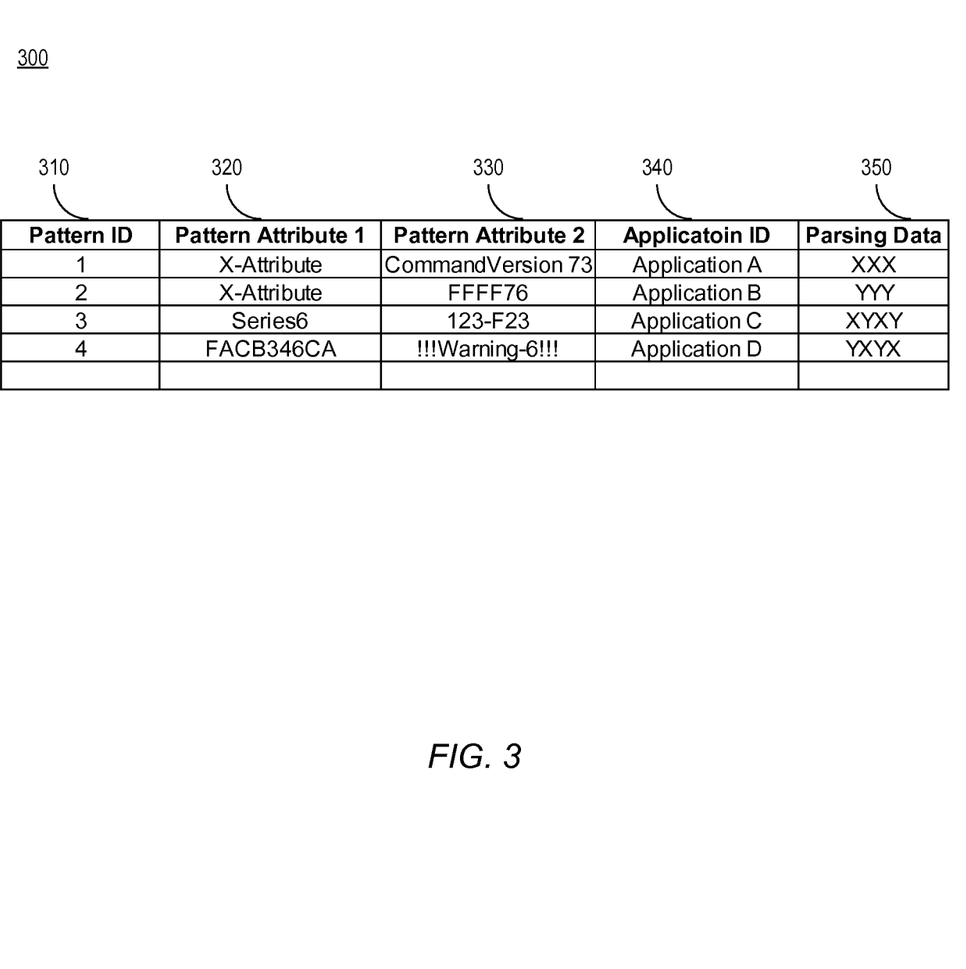
FIG. 3 illustrates a portion of a repository with defined patterns according to some embodiments.

Continuing with the above example, and now referring to FIG. 3, a portion of a repository 300 is illustrated according to some embodiments. The repository 300 may comprise a database table or a flat file. In some embodiments, the repository 300 may comprise fields such as, but not limited to, a pattern unique identifier 310, a first pattern attribute 320, a second pattern attribute 330, a software application or operating system 340 that is associated with the pattern, and data related to parsing 350 a log file for a particular application or operating system.

The pattern attributes "X-Attribute" and "CommandVersion 73" may be looked up in repository 300 to determine if these pattern attributes are associated with a known pattern. In the present example, pattern 1 of FIG. 300 is associated with both pattern attributes "X-Attribute" and "Command Version 73". Therefore, the pattern associated with pattern attributes "X-Attribute" and "CommandVersion 73" may be already stored in the repository.

At 140, when the pattern is determined to be stored in the repository data from the log file is exported into a database based on the determined pattern. The database may comprise a relational database such as database 460 of FIG. 4. The repository may comprise information associated with parsing a particular log file so that it may be imported into a database. For example, the parsing data may indicate where important information is located within a log file as well as which kinds of important information should be imported from a particular type of log file.

Continuing with the above example, since a pattern associated with the log file of FIG. 2 is a known pattern (e.g., it is stored in the repository), information from the log file may be automatically parsed and stored in a database based on the parsing data stored in the repository. For example, a structure of the log file may be parsed into known patterns and the information associated with the known patterns may be stored in the repository.

However, when the pattern associated with the log file is not known (e.g., the pattern is absent from the repository), the log file may be further analyzed. If a pattern or structure is not known, a new structure and associated patterns based on the log data content type may be identified and stored in the repository. In some embodiments, the new structure and associated patterns may be verified by a user prior to being stored in the repository. Now referring to FIG. 4, an embodiment of a system 400 is illustrated. The system 400 may comprise a log analyzer 450 that receives a log file from a computing device 410 (e.g., an IP enabled device). The log analyzer may determine information contained within the received log file and store the information associated with the log file in a database 460.

Figure 4:
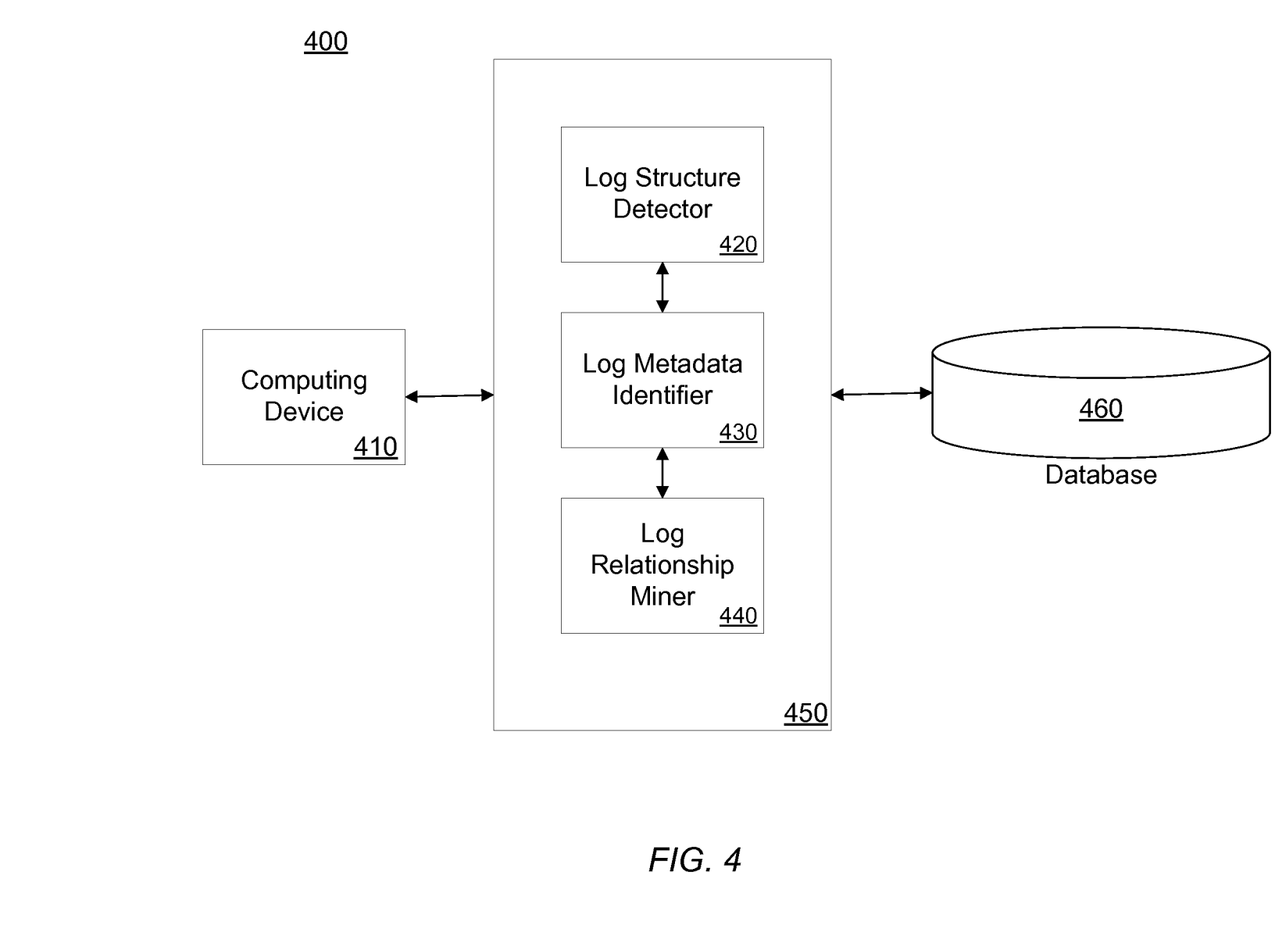
FIG. 4 illustrates a system according to some embodiments.

In some embodiments, the database 460 may comprise a column based in-memory database. An in-memory database may comprise a database management system that primarily relies on main memory for data storage and may be faster than a magnetic or optical disk based database.

The log analyzer 450 may comprise a log structure detector 420, a log metadata identifier 430 and a log relationship miner 440. The log structure detector 420 may automatically analyze the received log file to determine a pattern of structure associated with the log file. The log structure detector may also detect a log type, a log format and a log structure. In practice, the log file may be received at the log analyzer 450 in response to a selection of a file or folder that comprises the log file or via an automated input that may be used to receive log files that are to be automatically analyzed. The log structure detector 420 may classify a log type based on a type of application that may be associated with the log file. For example, the log structure detector 420 may determine that the log file 410 is a common log scheme associated with a windows operating system, or a log file associated with a SAP HANA database. The determination of an application associated with the log file may be based on a pattern of data stored in the log file.

The log structure detector 420 may also determine a log format of the log file. The log structure detector 420 may determine a type of delimiter associated with the log file such as, but not limited, to a comma, a space or a tab. For example, if a log structure is identified as comma separated values, the corresponding delimiter (e.g., the commas) may be used for log structure and log field parsing.

In some embodiments, the log file may comprise a schema description that is embedded within the log file and the log format may be based on the embedded schema description. For example, a schema description may be located at a start of the log file or the schema description may be embedded within the contents of the log file. In some embodiments, the log structure detector 420 may analyze a nested structure within the log file to determine a schema. Once a schema associated with the log file is determined, the log fields associated with schema may also be determined and parsed. In some other embodiments, a format of the log file may be automatically determined based on a log file type, historical data associated with the log file type as well as a context in which the log file is being used (e.g., stored on a server, stored on a router, etc.).

The log metadata identifier 430 may automatically discover the metadata, content type, and standardize field names associated with each field of the log file. Based on data associated with similar log files in a repository, and the determined schema, content types associated with each field may be determined. The content types may be based on the log file's data, patterns, distinct values and regular expressions. The log metadata identifier 430 may standardize the log fields based on identified content types. For example, a social security number ("SSN") may be standardized as "SSN" throughout the repository. However, in some embodiments, a user may be presented options such as, for example, "SSN", "SocialSecurityNumber", "Social", etc. The user may then select a desired name of a field. Having a user select a name for a field may be useful when a variety of field names may be possible based on a content type within a repository or to confirm a data type for a particular field.

Once log field content types are discovered, the log field content types are assigned to the parsed log fields (e.g., each parsed log field is assigned a corresponding content type). For example, field names and parameters may be standardized based on content from other log file patterns stored in the database 460. The determination of file names may be based on similar field names and parameters already stored in the database 460.

The log relationship miner 440 may automatically determine relationships in the log file 410 and among the other log file types stored in the database 460. Once content types for each field are identified, enhancement options for each log field may be suggested. For instance, and now referring to FIG. 6 and FIG. 7 which illustrate example database tables 600 and 700, respectively. Additional fields such as, but not limited to, longitude, latitude, country, and region may be added to the log file 410 as an enhancement for a log field "IP Address", and fields of month, year, and quarter may be enhancements for log field "Log Timestamp".

Figure 6:
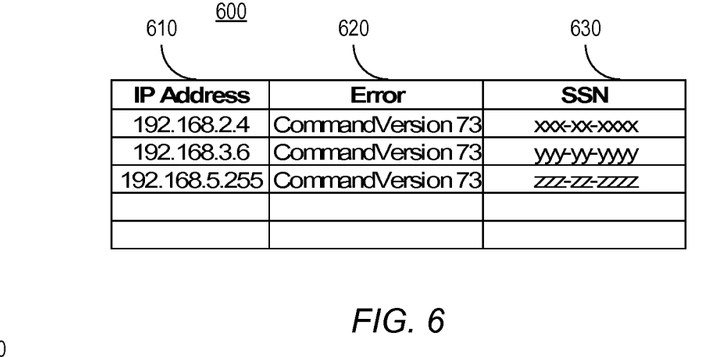
FIG. 6 illustrates a portion of a repository according to some embodiments.
Figure 7:
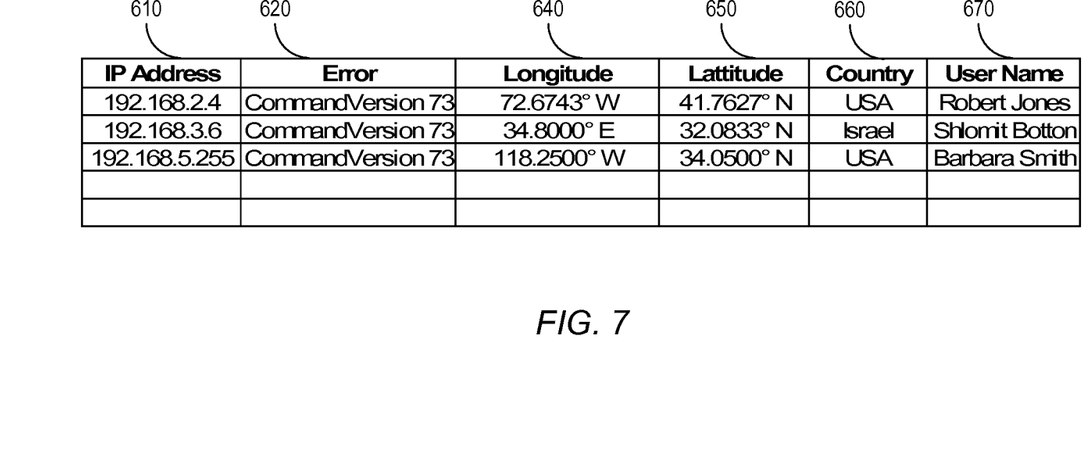
FIG. 7 illustrates a portion of a repository according to some embodiments.

As illustrated in FIG. 6, database table 600 may comprise data that was input from a log file. In the present example, database table 600 comprises an IP address 610, an error 620 associated with that IP address and an SSN of a user associated with the IP address 610. Database table 700 of FIG. 7, illustrates an enhanced version of database table 600 by the adding in the fields of longitude 640, latitude 650, country 660, and user name 670. In some embodiments, database tables may be automatically enhanced. In some embodiments, a user may be presented with a list of fields to potentially enhance the database table associated with the imported log file. In this embodiment, the user may be able to select which fields can be added to enhance the log file table.

Log fields such as "User ID" or "SSN" may have enhancement options that provide data protection. Log relationships of log fields and their metadata may be based on relationships inside the log itself or among multiple logs that are automatically discovered. Therefore, a user may be presented with relationships from other log tables and the user may decide which relationships to include in their log file. For example, if SSNs were included in the log file, the log analyzer may find a relationship to the SSN in another table (e.g., a user name, address, etc.) and this data may also be imported to enhance the data. To protect sensitive data, such as the SSN, the sensitive data may be substituted by other related fields, such as substituting an SSN for a user name and address as an identifier. This may limit dissemination of the users SSN that was contained in the log file. As illustrated in the example database tables 600 and 700, the SSN field 630 may be automatically changed to a user id field based on a relationship with another table in the database.

Figure 5:
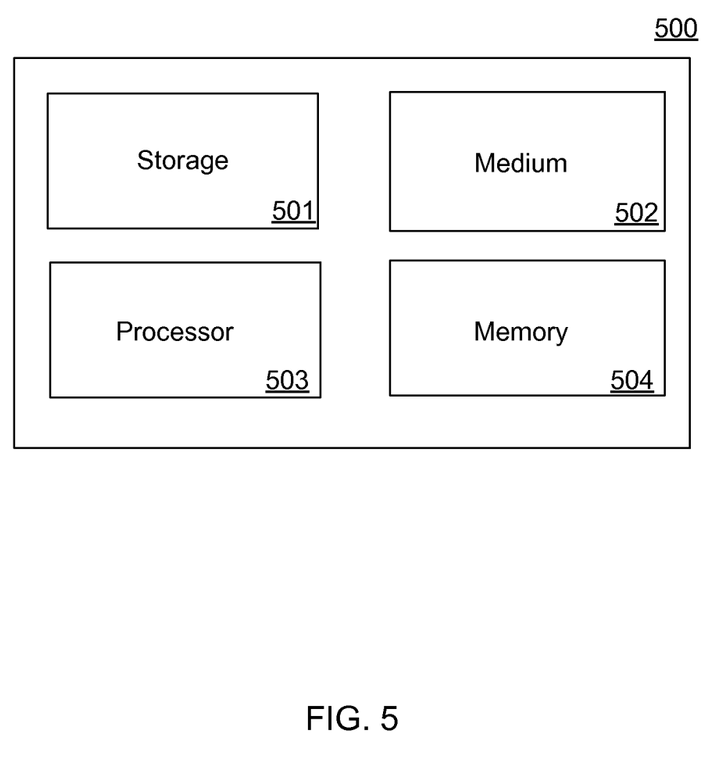
FIG. 5 illustrates an apparatus according to some embodiments.

Now referring to FIG. 5, an embodiment of an apparatus 500 is illustrated. In some embodiments, the apparatus 500 may be associated with a log file analyzer.

The apparatus 500 may comprise a storage device 501, a medium 502, a processor 503, and a memory 504. According to some embodiments, the apparatus 500 may further comprise a digital display port, such as a port adapted to be coupled to a digital computer monitor, television, portable display screen, or the like.

The medium 502 may comprise any computer-readable medium that may store processor-executable instructions to be executed by the processor 503. For example, the medium 502 may comprise a non-transitory tangible medium such as, but not limited to, a compact disk, a digital video disk, flash memory, optical storage, random access memory, read only memory, or magnetic media.

A program may be stored on the medium 502 in a compressed, uncompiled and/or encrypted format. The program may furthermore include other program elements, such as an operating system, a database management system, and/or device drivers used by the processor 503 to interface with peripheral devices.

The processor 503 may include or otherwise be associated with dedicated registers, stacks, queues, etc. that are used to execute program code and/or one or more of these elements may be shared there between. In some embodiments, the processor 503 may comprise an integrated circuit. In some embodiments, the processor 503 may comprise circuitry to perform a method such as, but not limited to, the method described with respect to FIG. 1.

The processor 503 communicates with the storage device 501. The storage device 501 may comprise any appropriate information storage device, including combinations of magnetic storage devices (e.g., a hard disk drive), optical storage devices, flash drives, and/or semiconductor memory devices. The storage device 501 stores a program for controlling the processor 503. The processor 503 performs instructions of the program, and thereby operates in accordance with any of the embodiments described herein. For example, the processor 503 may determine information associated with a log file.

The main memory 504 may comprise any type of memory for storing data, such as, but not limited to, a flash driver, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 504 may comprise a plurality of memory modules.

As used herein, information may be "received" by or "transmitted" to, for example: (i) the apparatus 500 from another device; or (ii) a software application or module within the apparatus 500 from another software application, module, or any other source.

In some embodiments, the storage device 501 stores a database (e.g., including information associated with log files). Note that the database described herein is only an example, and additional and/or different information may be stored therein. Moreover, various databases might be split or combined in accordance with any of the embodiments described herein.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method of analyzing log files, the method comprising:
    sampling a log file comprising a plurality of structures;
    determining, via a processor, one of the plurality of structures associated with the log file based on the sampling and a pattern within the one of the plurality of structures;
    determining a type of delimiter associated with the log file;
    determining if the one of the plurality of structures and the pattern are stored in a repository;
    parsing the log fields based on the type of delimiter;
    discovering log field content types based on the log file's data, patterns, distinct values and regular expressions;
    assigning log field content types to the parsed log fields;
    determining that a variety of field names are possible based on content from previously stored log file patterns within the repository;
    presenting field name options to a user to select a field name based on the determined variety of field names;
    standardizing the parsed log fields based on a selected field name from the previously stored log file patterns within the repository; and
    exporting data from the log file into a database.

2. The method of claim 1, wherein sampling comprises analyzing the log file line by line and exporting is based on the schema embedded within a start of the log file.

3. The method of claim 1, further comprising determining a format of the log file based on a location of the log file.

4. The method of claim 1, wherein the method further comprises:

standardizing log fields further based on receiving a selection of field names from a variety of possible field names for the log fields that are stored within the repository; and saving the pattern in the repository.

5. The method of claim 4, wherein the method further comprises:

proposing enhancements.

6. The method of claim 5, wherein proposing enhancements comprises:

presenting related fields to a user, the related fields associated with data contained within the log file.

7. The method of claim 4, wherein the method further comprises:

presenting related fields to a user, the related fields associated with one or more other log files.

8. A non-transitory computer-readable medium comprising instructions that when executed by a processor perform a method of analyzing log files, the method comprising:

sampling a log file;

determining, via a processor, a structure associated with the log file based on the sampling and a pattern within the structure;

determining if the structure and the pattern are stored in a repository;

determining a type of delimiter associated with the log file;

parsing the log fields based on the type of delimiter;

discovering log field content types based on the log file's data, patterns, distinct values and regular expressions;

assigning log field content types to the parsed log fields;

determining that a variety of field names are possible based on content from previously stored log file patterns within the repository;

presenting field name options to a user to select a field name based on the determined variety of field names;

standardizing the parsed log fields based on a selected field name from the previously stored log file patterns within the repository; and exporting data from the log file into a database.

9. The medium of claim 8, wherein sampling comprises analyzing the log file line by line and exporting is based on the schema embedded within a start of the log file.

10. The medium of claim 8 further comprising determining a format of the log file based on a location of the log file.

11. The medium of claim 8, wherein the method further comprises:

standardizing log fields further based on receiving a selection of field names from a variety of possible field names for the log fields that are stored within the repository; and saving the pattern in the repository.

12. The medium of claim 11, wherein the method further comprises:

proposing enhancements.

13. The medium of claim 12, wherein proposing enhancements comprises:

presenting related fields to a user, the related fields associated with data contained within the log file.

14. The medium of claim 11, wherein the method further comprises:

presenting related fields to a user, the related fields associated with one or more other log files.

15. A system comprising:

a processor; and a non-transitory computer-readable medium comprising instructions that when executed by a processor perform a method of analyzing log files, the method comprising:

sampling a log file;

determining a structure associated with the log file based on the sampling and a pattern within the structure;

determining if the structure and the pattern are stored in a repository;

determining a type of delimiter associated with the log file;

parsing the log fields based on the type of delimiter;

discovering log field content types based on the log file's data, patterns, distinct values and regular expressions;

assigning log field content types to the parsed log fields;

determining that a variety of field names are possible based on content from previously stored log file patterns within the repository;

presenting field name options to a user to select a field name based on the determined variety of field names;

standardizing the parsed log fields based on a selected field name from the previously stored log file patterns within the repository; and exporting data from the log file into a database.

16. The system of claim 15, wherein sampling comprises analyzing the log file line by line and exporting is based on the schema embedded within a start of the log file.

17. The system of claim 15 further comprising determining a format of the log file based on a location of the log file.

18. The system of claim 15, wherein the method further comprises:

standardizing log fields further based on receiving a selection of field names from a variety of possible field names for the log fields that are stored within the repository; and saving the pattern in the repository.

19. The system of claim 15, wherein the schema is determined by analyzing a nested structure within the log file.

20. The system of claim 15, wherein the method further comprises presenting related fields to a user, the related fields associated with data contained within the log file.

* * * * *